(12) United States Patent
Opachich et al.

(10) Patent No.: US 9,837,238 B2
(45) Date of Patent: Dec. 5, 2017

(54) PHOTOCATHODE

(71) Applicant: National Security Technologies, LLC, Las Vegas, NV (US)

(72) Inventors: Yekaterina Opachich, Las Vegas, NV (US); Andrew MacPhee, Las Vegas, NV (US)

(73) Assignee: National Security Technologies, LLC, North Las Vegas, NV (US)

( * ) Notice: Subject to any disclaimer, the term of this patent is extended or adjusted under 35 U.S.C. 154(b) by 0 days.

(21) Appl. No.: 15/249,197

(22) Filed: Aug. 26, 2016

(65) Prior Publication Data

US 2017/0062169 A1    Mar. 2, 2017

Related U.S. Application Data

(60) Provisional application No. 62/210,394, filed on Aug. 26, 2015.

(51) Int. Cl.
*H01J 1/34* (2006.01)
*G01T 1/28* (2006.01)

(52) U.S. Cl.
CPC ............. *H01J 1/34* (2013.01); *G01T 1/28* (2013.01); *H01J 2201/3421* (2013.01)

(58) Field of Classification Search
CPC ..................................... G01T 1/28; H01J 1/34
See application file for complete search history.

(56) References Cited

U.S. PATENT DOCUMENTS 3,812,559 A   5/1974  Spindt et al.
3,838,273 A   9/1974  Cusano 5,140,162 A   8/1992  Stettner
5,192,861 A   3/1993  Breskin et al.
5,307,815 A   5/1994  Gatzke et al.
5,319,189 A   6/1994  Beauvais et al.
5,646,479 A   7/1997  Troxell (Continued)

OTHER PUBLICATIONS

"X-Ray Interactions: Photoabsorption, Scattering, Transmission, and Reflection at E=50-30,000 eV, Z=1-92", Henke, et al., Atomic Data and Nuclear Data Tables vol. 54, No. 2, 181-342, Center for X-Ray Optics, Lawrence Berkeley Laboratory, Copyright © 1993 by Academic Press, Inc., Jul. 2, 1993.

(Continued)

*Primary Examiner* — David Porta
*Assistant Examiner* — Faye Boosalis
(74) *Attorney, Agent, or Firm* — Weide & Miller, Ltd.

(57) ABSTRACT

A photocathode designs that leverage the grazing incidence geometry yield improvements through the introduction of recessed structures, such as cones, pyramids, pillars or cavities to the photocathode substrate surface. Improvements in yield of up to 20 times have been shown to occur in grazing incidence geometry disclosed herein due to a larger path length of the X-ray photons which better matches the secondary electron escape depth within the photocathode material. A photocathode includes a substrate having a first side and a second side, the first side configured to receive x-ray energy and the second side opposing the first side. A structured surface is associated with the second side of the substrate such that the structured surface includes a plurality of recesses from the second side of the substrate into the substrate.

19 Claims, 10 Drawing Sheets

(56) References Cited

U.S. PATENT DOCUMENTS 5,656,807 A     8/1997  Packard
5,804,833 A     9/1998  Stettner et al.
8,581,228 B2 * 11/2013  DeFlumere ............ G02B 5/122
                                                         257/10

OTHER PUBLICATIONS

"High Energy Photocathodes for Laser Fusion Diagnostics", Halvorson, et al., AIP Review of Scientific Instruments 81, 10E309 (2010) ©2010, American Institute of Physics, 4 pages.

* cited by examiner

Cathode Patterns (Top View)

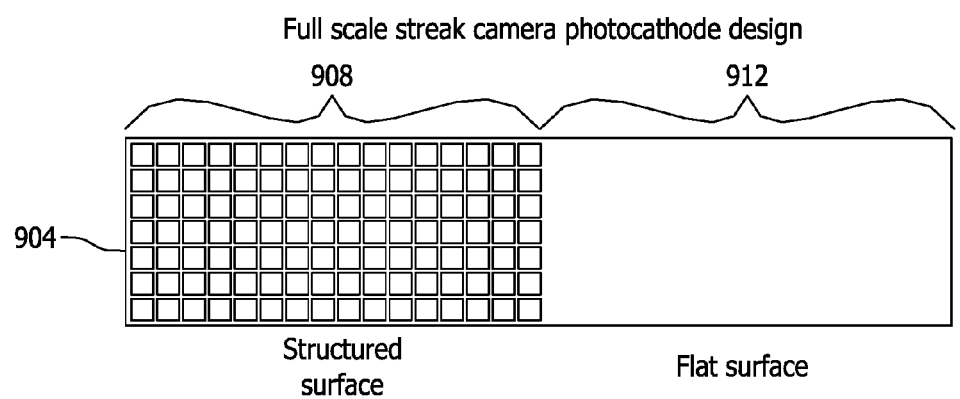
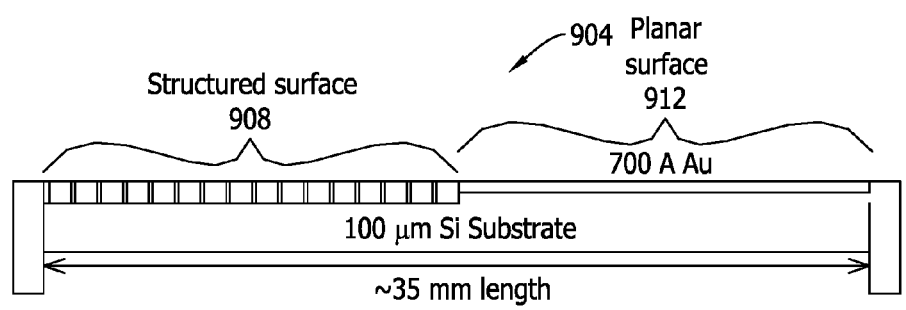
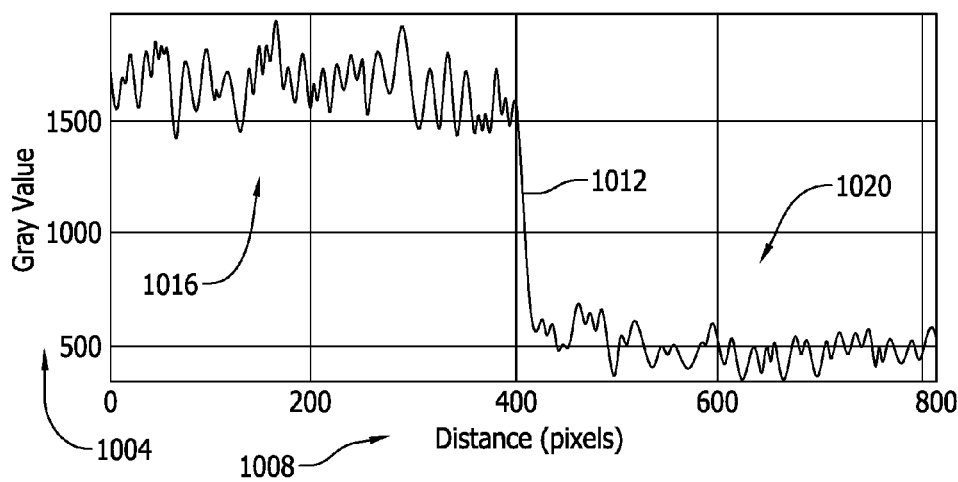

PHOTOCATHODE

1. PRIORITY CLAIM

This application claims priority to and the benefit of U.S. Provisional Patent Application No. 62/210,394 filed on Aug. 26, 2015 and titled Improved Detector.

2. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

3. FIELD OF THE INVENTION

The invention relates to x-ray detection and in particular to structured photocathodes to increase total electron yield.

4. RELATED ART

X-ray detectors, such as time dilation cameras and streak cameras are widely used in many applications ranging from laser driven plasma imaging to radiography and diffraction measurements. Recent advances in radiography have extended the imaging range well above 10 keV, and there is a need for an efficient photocathode in the spectral energy range from 1 to 30 keV. To date no reliable photocathode has been produced.

Detector efficiency and performance in these X-ray ranges is largely limited by the total quantum electron yield (TEY) and secondary electron kinetic energy distribution. Most X-ray detectors operate at normal incidence, i.e., X-ray photons are at a 90 incidence angle to the photocathode, and suffer a loss in quantum efficiency at energies greater than 5 keV.

For example, X-ray diagnostics are an integral part of experiments performed at the National Ignition Facility (NIF). For example, Diagnostic Instrument Manipulator Imaging Streak Camera (DISC) and a Streaked Polar Instrumentation for Diagnosing Energetic Radiation (SPIDER) are used as temporal imagers in radiography studies, as streaked x-ray spectrometers for backlighter source characterization, and as timing instruments. Drift tube detectors such as the Dilation x-ray Imager (DIXI) are also used as 2-D imagers of various targets. Until recently, these detectors have been used to collect data in the 1-10 keV range. However, recently a new system is proposed that will extend the available x-ray energies up to >300 keV. Current diagnostics, especially those that utilize common photocathode materials, suffer from a drastic decrease in quantum efficiency above ~10 keV 7-10. This reduces the detector efficiency of the National Ignition Facility (NIF) detectors and can potentially compromise data quality. As a result, there is a need in the art for a detector which is efficient at higher x-ray energies.

SUMMARY

Disclosed herein are details and results of a set of photocathode designs that leverage the grazing incidence geometry yield improvements through the introduction of recessed structures, such as cones, pyramids, pillars or cavities to the photocathode substrate surface. Improvements in yield of up to 20 times have been shown to occur in grazing incidence geometry disclosed herein due to a larger path length of the X-ray photons which better matches the secondary electron escape depth within the photocathode material.

In one embodiment, a photocathode for use in x-ray detection from 1 keV to 30 keV is disclosed that includes a substrate having a first side and a second side, the first side configured to receive x-ray energy and the second side opposing the first side. A structured surface is associated with the second side of the substrate such that the structured surface comprises a plurality of recesses from the second side of the substrate into the substrate.

In one embodiment the second side of the substrate is coated with gold or cesium iodide. In one configuration, the recess is a cone shape or a pyramid shape. In one variation, the recess includes a recess side wall that extends from the planar top surface into the substrate such that the wall angle of the recess is 10 degrees. In another embodiment, the recess wall angle is 5 degrees.

Also disclosed is a method for generating electrons based on x-ray strikes on a photocathode. In this method of operation, a photocathode is provided in an x-ray path. The photocathode comprises a substrate having a first surface and a second surface. The first surface faces the x-ray path and the second surface is generally parallel to and opposite the first surface, the second surface configured with a structured surface including recesses in the second surface, the recesses extending from the second surface toward the first surface. Emitting x-ray energy in the range of 1 keV to 12 keV to the photocathode and detecting x-rays striking the photocathode based on electron yield from the photocathode.

In one embodiment the distance between the first surface and second surface is less than 200 microns. It is contemplated that this distance may be any value and the claims that follow are not limited to a particular distance. The recesses are formed from one or more side walls that extend into the substrate. In various embodiments the depth of the recesses are 16 microns for full cone depth, 8 microns for mid depth cone, and 4 microns for shallow depth cone.

This method may further include coating the second surface and the interior of the recesses with gold or cesium iodide. It is contemplated that the recesses are conical shaped with a pointed or flat top on the end of the recess opposite the second surface. The recesses may also be pyramid shaped with a pointed or flat top. In one variation, the recess includes a recess side wall that extends from the planar top surface into the substrate such that the wall angle of the recess is 10 degrees. In another embodiment, the recess wall angle is 5 degrees. It is contemplated that with this method the electron yield efficiency is greater than $0.04^8$ electrons per photons at 1.5 keV.

In one embodiment, a photocathode for use in x-ray detection is disclosed that includes substrate having a first surface configured to receive x-ray energy. In one embodiment, the substrate portion has a total thickness of 500 microns and is back etched to be 100 microns under the structured region to reduce x-ray absorption through the Si substrate. The substrate located between the first surface and a second surface associated with the substrate. In this embodiment, the second surface opposes the first side and the second surface has a generally planar top surface with a plurality of recesses extending from the planar top surface into the substrate.

In one configuration the second side is coated with gold or cesium iodide. In one embodiment, the recess is a cone shape having an open cone base on the top surface that narrows as it extends into the substrate toward a pointed or flat end opposing the open cone base. Also contemplated is having the recess configured as a pyramid shape having an open pyramid base on the top surface that narrows as it extends into the substrate toward a pointed or flat end opposing the open pyramid base. In one variation, the recess includes a recess side wall that extends from the planar top surface into the substrate such that the wall angle of the recess is 10 degrees. In another embodiment, the recess wall angle is 5 degrees.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 9A illustrates a top plan view of a photodetector arranged according the present invention for use in testing.

FIG. 9B illustrates side view of the photodetector of FIG. 9A.

FIG. 9C illustrates a signal plot resulting from the photocathode output shown in FIG. 9A.

DETAILED DESCRIPTION

Figure 1:
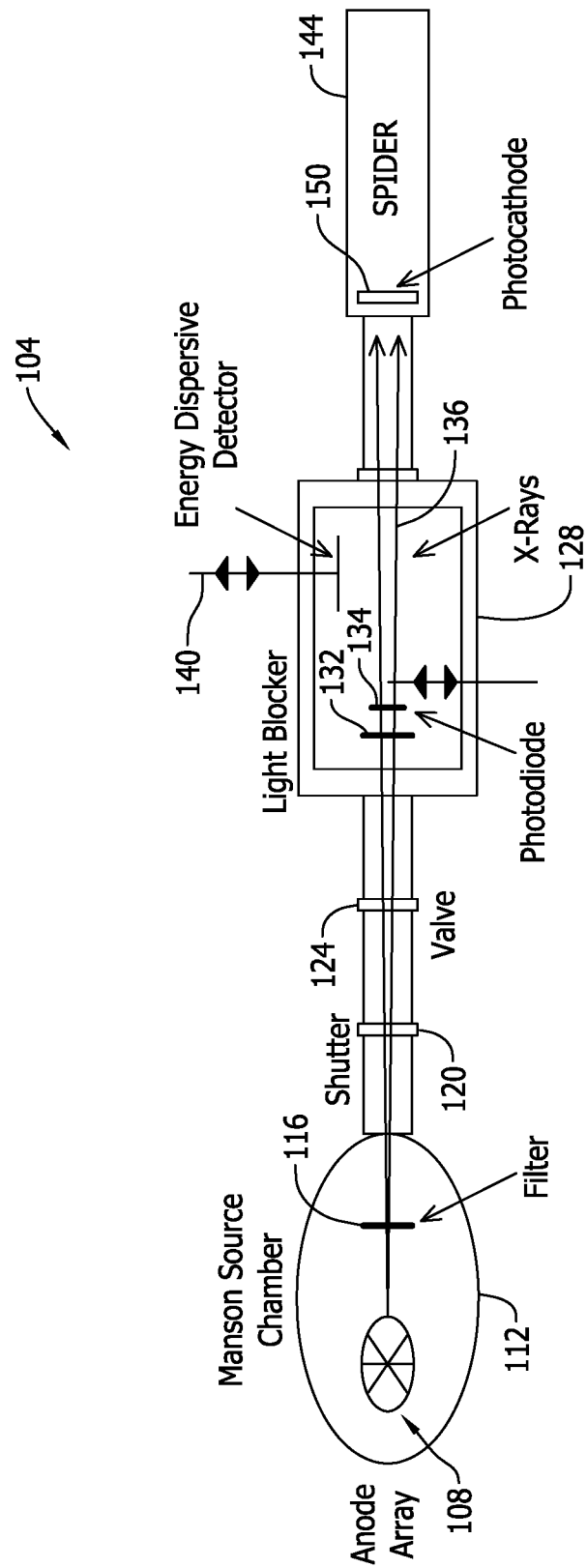
FIG. 1 is a block diagram of an exemplary environment of use of the structure photocathode.

FIG. 1 illustrates an exemplary environment of use of the structured photocathode as disclosed and described below. This is but one possible environment of use and it is contemplated that the photocathode may be used in any existing or future develop environment where photocathodes are used.

In this example environment of use, is a streak camera, such as for example Streaked Polar Instrumentation for Diagnosing Energetic Radiation (SPIDER) camera. To provide the SPIDER streak camera with input, additional elements 104 are required. As shown in FIG. 1, an anode array 108 is part of a Manson course vacuum chamber 112 generates and directs x-rays through a filter 116 into a valve tube that includes a shutter 120 and a valve 124 configure to selectively pass x-ray energy. Located after the valve tube is a chamber 128 containing a light blocker 132, photodiode 134, and energy dispersive detector 140. These elements operate as understood by one of ordinary skill in the art and as such are not described in detail herein but are provided to aid in understanding and provide one example environment of use.

Passing out of the chamber 128 are x-rays 136. The x-rays strike a photocathode 150 and the resulting output of the photocathode 150 is processed by the SPIDER camera 144 as is understood by one of ordinary skill in the art. In this example embodiment, the streak camera is placed 1 meter away from the anode source. As discussed below, the broadband Manson X-ray source shown in FIG. 1 was used to characterize the performance of three full-scale structured photocathodes as discussed below in the test results. The source of the chamber 112 was set to generate Ni K-α lines at ~7.5 keV by adjusting the anode 108 to filament voltage and using a 3 μm thick Ni filter. The SPIDER camera 144 is a multi-record length streak camera system, with a 1.2 times magnification and ~81 μm spatial resolution. Potential changes in spatial resolution were measured during testing by using a spatial resolution mask (not shown). The mask was laser cut into a 20 μm thick Ta foil, the pattern contained a series of 50 μm wide slits evenly spaced 1.5 mm apart. The pattern was placed directly in front of each photocathode, and 1 meter away from the X-ray source.

Figure 2:
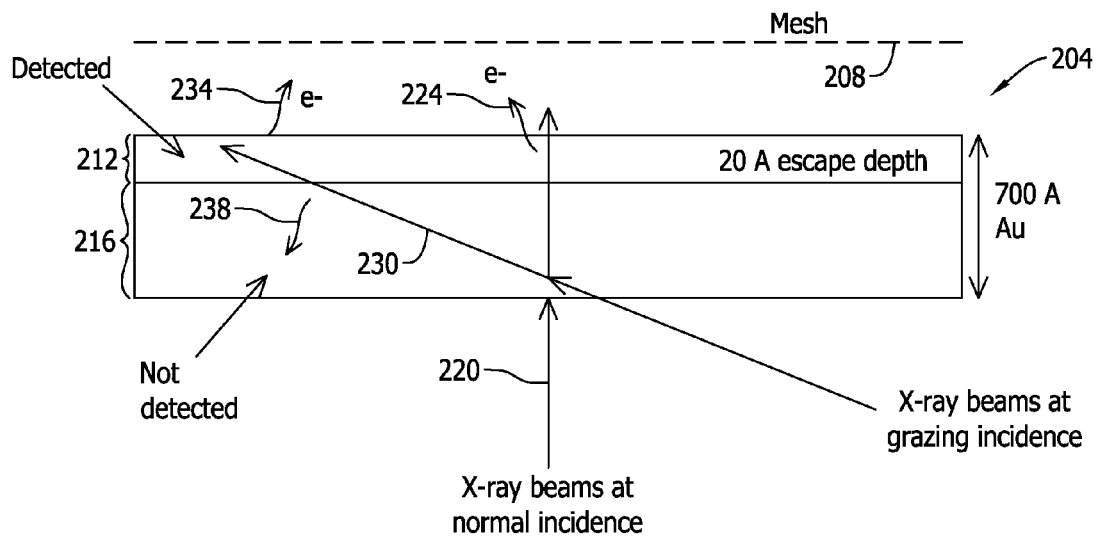
FIG. 2 illustrates a photocathode with x-ray beam strike angles.

In operation, a photocathode is a negatively charged electrode in a light detection device such as a photomultiplier or phototube that is coated with a photosensitive compound. When the photocathode is struck by a quantum of light (photon, x-ray), the absorbed energy causes electron emission due to the photoelectric effect. It is desirable to maximize the output energy from the photocathode, defined as the electron yield, for a given input. The X-ray yield increase seen at grazing incidence due to the disclosed structured surface has been verified experimentally as discussed below FIG. 2 illustrates a photocathode with x-ray beam strike angles. As shown the photocathode 204 is arranged adjacent a mesh 208. The photocathode 204 emits electrons 224, 234 as shown. The photocathode 204 is divided into two layers 212, 216. Layer 212 is the 20 Angstrom escape depth while layer 216 is defined as the substrate. The total depth of the photocathode 204 is approximately 700 Angstroms and is entirely or partially formed from Au (gold) or CsI (cesium iodide), or any other material.

When arranged for use, x-ray beams strike the photocathode 204 at various angles. Incident x-rays 220 strike the photocathode 204 at a generally perpendicular angle causing an emission of an electron 224. Other grazing x-rays 230 strike the photocathode 204 at a grazing angle and emit an electron 234. Therefore, matching the X-ray path length to the escape depth at grazing incidence increases the electron yield. Electron yield is increased when x-rays strike the photocathode at an incident angle other than 90 degrees because such incidence strike increases the distance the x-ray travels within the escape depth 212, which in turn increases detectable electron emissions.

Proposed herein is a new version of Fraser's derivation with assumptions most relevant to the 1-10 keV X-ray range. A full version of the equation (1) listed should be used for X-ray energies >10 keV, where the primary electron signal contribution to the TEY must be considered. Assuming that the measured TEY (total electron yield) consists mostly of secondary electrons, and that the fluorescent decay of the photoelectron is negligible, for a thin photocathode it can be shown that for a X-ray of energy $E_x$ incident onto a photocathode of thickness T at an angle α, to the photocathode surface, the secondary photocurrent, $(\chi_c)_s$ is given by the following equation:

$$(\chi_c)_s = [1-R(\alpha)]fP_s(0)E_x\epsilon^{-1}(1+\beta)^{-1}Y(T), \quad (1)$$

where $\beta=(\mu L_s \csc \alpha')^{-1}$, R(α) is the Fresnel reflectivity coefficient, and α' is the refracted angle of the X-ray beam with respect to the photocathode surface. $P_s(0)$ is the secondary electron escape probability, ε is the energy needed to promote an electron above the valence band and escape into vacuum, μ is the linear absorption coefficient, f is the fraction of X-ray energy available for generation of secondary electrons, $L_s$ is the secondary electron escape length, and Y(T) is the relative yield versus thickness function:

$$Y(T)=1-\exp[-(\mu\csc\alpha'+L_s^{-1})T]. \quad (2)$$

This equation was used to determine the expected yield as a function of angle and X-ray energy for CsI and Au. Since Y(T) is ≈1 for typical photocathode thicknesses T>>$L_S$, and β is >>1 for X-ray mean free path 1/μ>>$L_S$, equation (1) simplifies to $(\chi_C)_s$~$C\mu L_s\csc\alpha'$. In equation (2), C represents the first five terms of equation (1). The resulting TEY, plotted as a function of energy in FIGS. 7A and 7B. Based on these results, the structures shown below were developed for the photocathode 204.

Figure 3:
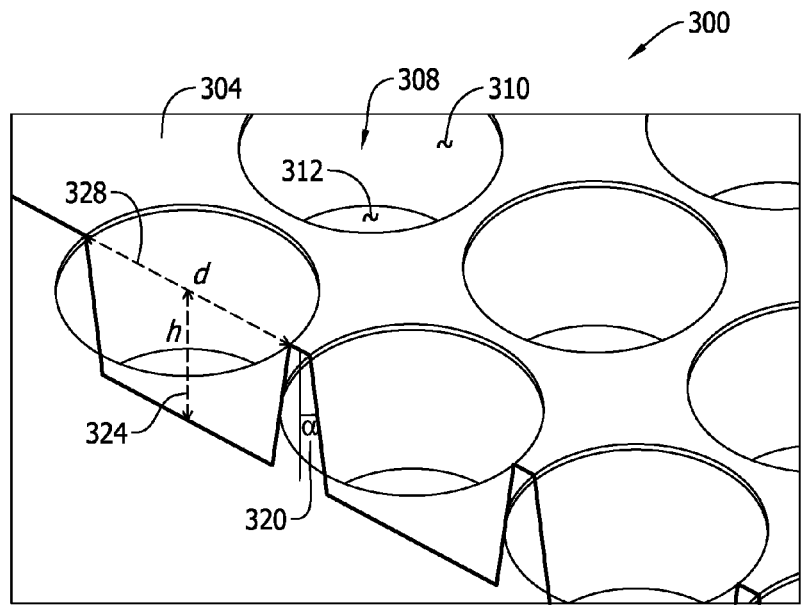
FIG. 3 illustrates on exemplary photocathode surface structure.

FIG. 3 illustrates on exemplary photocathode surface structure. As shown the photocathode 300 includes a top surface 304 and one or more depressions 308. The depressions 308 have one or more side walls 310 and a bottom surface 312 or point. The depressions 308 change the x-ray incident angle at which x-rays strike the photocathode 300 as compared to prior art planar surface thereby increasing electron yield resulting from x-ray strikes. The depressions 308 may be any size or shape. Prior art attempts using structures which extend upward from the surface have not been successful. A structure wall angle α 320 of 10°-15° was chosen as a balance between maximizing cscα' and foreshortening the photocathode depth. In other embodiments the angle my range from 0.01 degrees to 30 degrees. In other embodiments, the structure wall angle may range from 8°-17° while in other embodiments the structure wall angle may range from 6°-19°. In yet other embodiment, the angle may range to greater values such that change in the angle of incidence, as compared to a planar surface, increases or changes electron yield and spacial resolution.

Defined in FIG. 3 are also a diameter d 328 and height h 324. The height h 324 is the height or depth of the depression 308 from the top surface (side) 304. The diameter d 328 is defined as the distance across the top of the depression (recess) 308. Dimension units other than diameter may be used if the shape of the open top of the depression is other than a circle, as is discussed below.

Figure 4A:
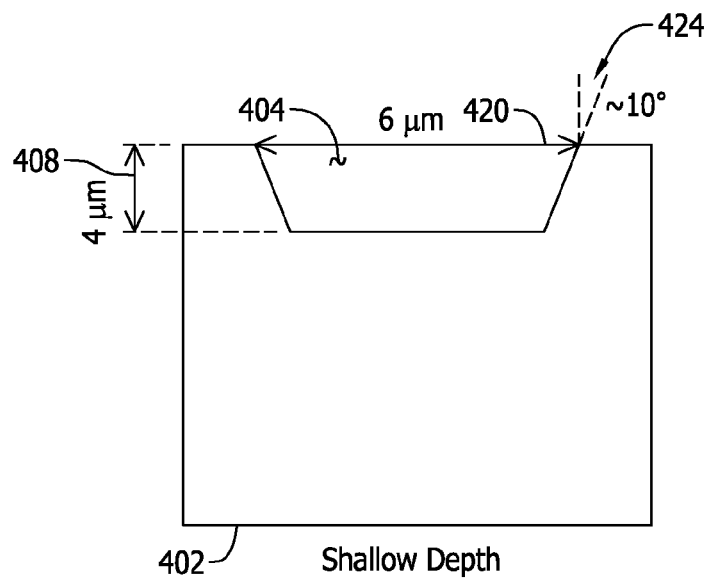
FIGS. 4A, 4B, and 4C illustrate three possible variations of structure size and shape for the photocathode recesses.
Figure 4B:
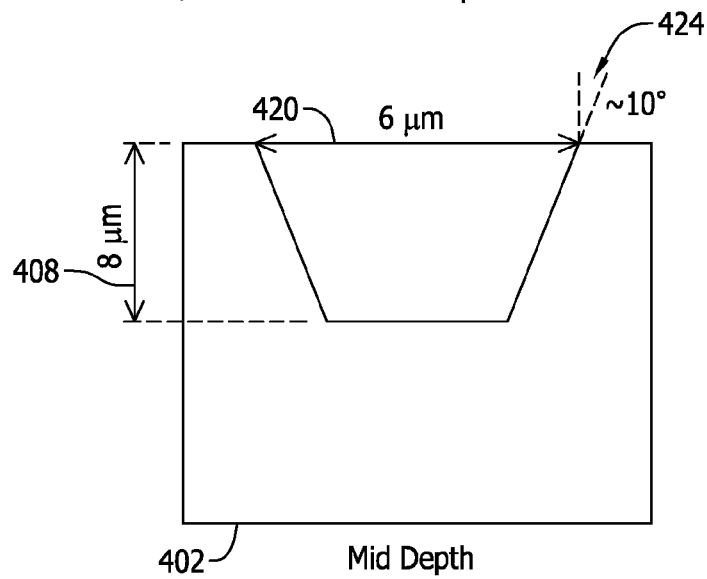
Figure 4C:
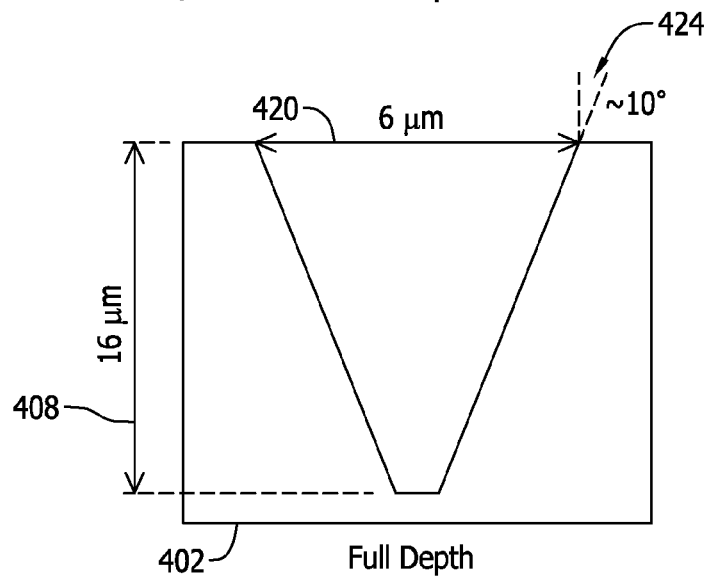

FIGS. 4A, 4B, 4C illustrate three possible variations of structure size and shape for the photocathode recesses. These figures provide a cross sectional perspective view of the recessed pyramid structures in the structured surface region of the photocathodes. These are exemplary only and provided to aid understanding. The claims that follow should not be limited to these shapes and dimensions. The photocathode 402 is etched, built up, or otherwise configured with structures 404. As shown in FIG. 4A, the height of the surface structure 404 (depression) may be made shallow with a shallow depth 408 while maintaining a diameter 420 and an incidence angle 424 consistent between configurations. In FIG. 4A, the height 408 is 4 μm, the diameter of the opening to the top surface is 6 μm and the incidence angle is approximately 10° as shown. These values are exemplary only and the claims are not limited to these values or ratios. In FIGS. 4B and 4C, similar elements are labeled with identical reference numbers. In the photodetector 402, the diameter and incidence angle are maintained the same for the mid depth configuration (FIG. 4B) and the full depth configuration (FIG. 4C). However, the mid depth configuration (FIG. 4B) increases the height to 8 μm and the full depth configuration (FIG. 4C) increases the height to 16 μm. These values are exemplary only and the claims are not limited to these values or ratios. In other embodiments other heights, diameters and angles may be adopted for use.

The structures were etched into an Si substrate using a plasma etching system, producing a high aspect ratio structure with 5-15 degree wall angles as shown. In this embodiment, the angle is 10 degrees. The angle may vary from 0.01 degrees (essentially a rod or column structure) to 30 degrees in various embodiment and the selection of the angle may be adjusted to account for spacial resolution and x-ray energies. The Si substrate was back-thinned to 100 μm under both regions, in order to maximize X-ray transmission, i.e., 18% transmission at 7.5 keV. Both regions were coated with a Ti wetting layer, and 700 Å of gold. The prototype cathodes consisted of recessed pyramid structures that were 6×6 μm in width, and had three depths 4, 8, and 16 μm respectively as shown and described above. These are referred to as the shallow depth, mid depth, and full depth structures. The side by side design was developed to ensure that the two regions are easily comparable within the same exposure.

Figure 5A:
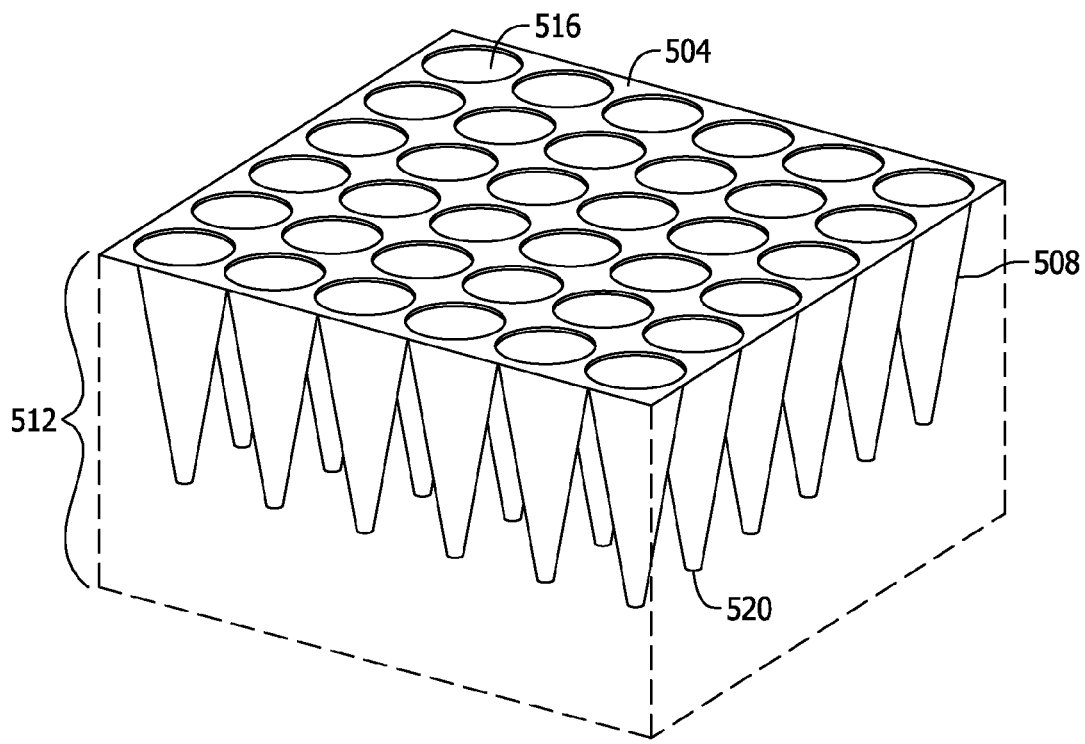
FIG. 5A illustrates an alternative configuration for the structured photocathode as compared to the arrangement of FIG. 3.

FIG. 5A illustrates an alternative configuration for the structured photocathode as compared to the arrangement of FIG. 3. In this embodiment, the top surface, which would oppose the x-ray source is presented with numerous code shapes 508 which are recessed into a photocathode 512. The recessed cone is formed with a generally round opening 516 in the top surface that extends into the photocathode 512 and ends at a point 520 or near point at the end of recess opposing the opening.

Figure 5B:
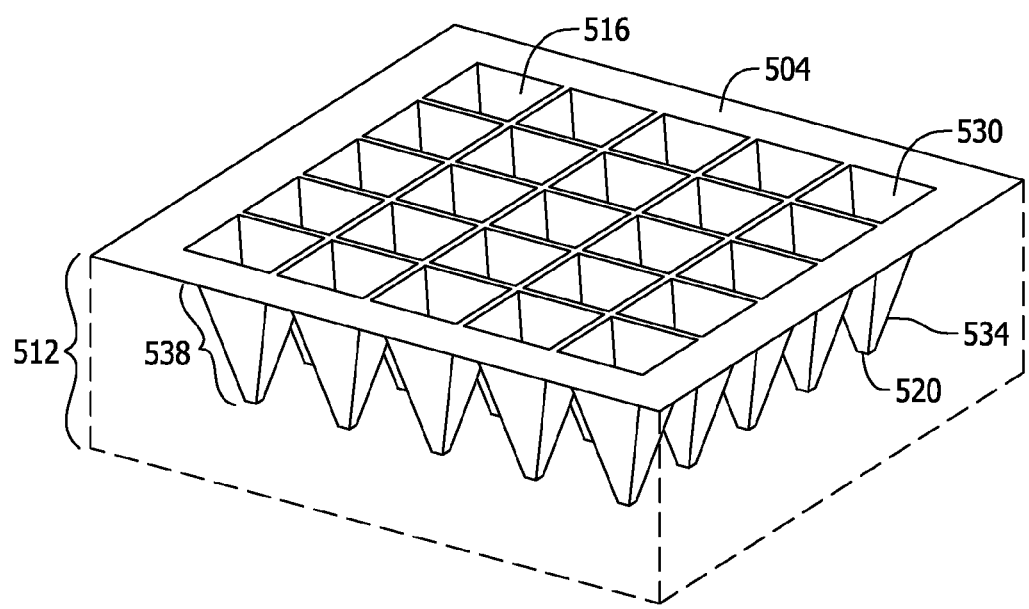
FIG. 5B illustrates an alternative configuration for the structured photocathode as compared to the arrangement of FIG. 3.

FIG. 5B illustrates an alternative configuration for the structured photocathode as compared to the arrangement of FIG. 3. In this embodiment, the top surface 504 is presented with numerous pyramid shapes 534 which are recessed into a depth of the photocathode 512 on the side opposing the x-ray source. The recessed pyramid 534 is formed with a generally square opening 516 in the top surface 504 that extends into the photocathode 512 and ends at a point 520 or near point at the end of recess opposing the opening. The pyramid is formed from four side walls 538. In other embodiments the opening may not be square and the number of sides will vary accordingly.

Figure 5C:
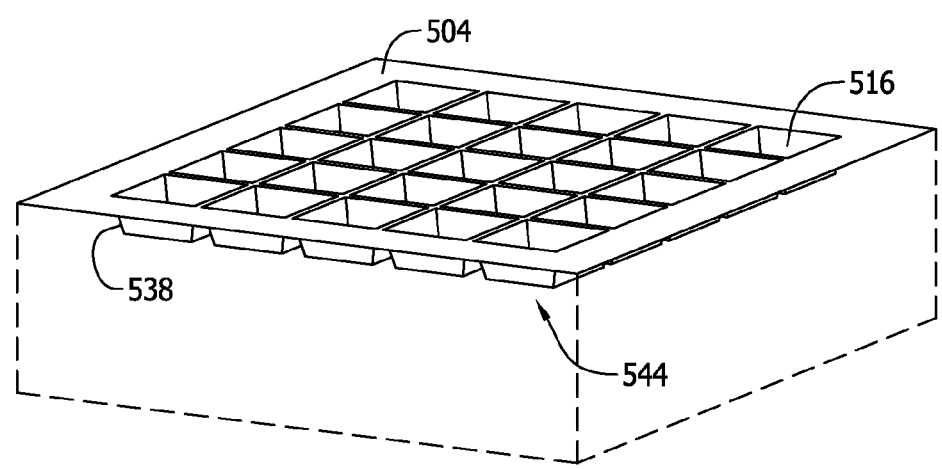
FIG. 5C illustrates an alternative configuration for the structured photocathode as compared to the arrangement of FIG. 3.

FIG. 5C illustrates an alternative configuration for the structured photocathode as compared to the arrangement of FIG. 3. In this embodiment, the top surface 504 is presented with numerous pyramid shapes 534 which are recessed into a depth of the photocathode 512. The recessed pyramid 534 is formed with a generally square opening 516 in the top surface 504 that extends into the photocathode 512 and ends at a generally flat inner surface 544 at the end of recess opposing the opening. The pyramid is formed from four side walls 538, which are shorter or smaller than the embodiment of FIG. 5B.

The various shapes, sizes, and configurations of the recesses in the top surface of the photocathodes are exemplary only. It is contemplated that other shapes, dimensions and arrangements of recesses into the photocathode may be developed and used without departing from the claims that follow. By increasing the angle of incidence on x-rays striking the surface of the photocathode, the effective electron yields are increased. For example, the shapes may include but are not limited to: capillaries, pillars, pyramids, cones, hemispheres and other structures that increase the overall cathode surface area. In general, any shape that increase the overall cathode surface area, with inwardly sloping wall angles that are chosen for maximum yield at a given X-ray energy may be used.

Figure 6A:
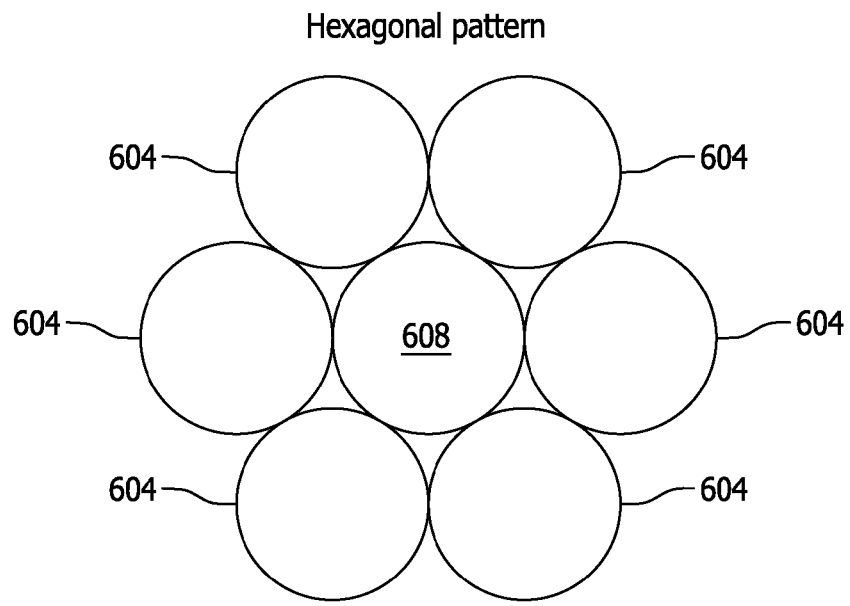
FIG. 6A illustrates exemplary recess opening arrangements in a photocathode top surface.

FIG. 6A illustrates exemplary recess opening arrangements in a photocathode top surface. FIG. 6A is a top plan view of the top surface of a photocathode. The recesses may occur in any arrangement. As shown in FIG. 6A, six openings 604 are arranged in a hexagonal pattern around a center opening 608.

Figure 6B:
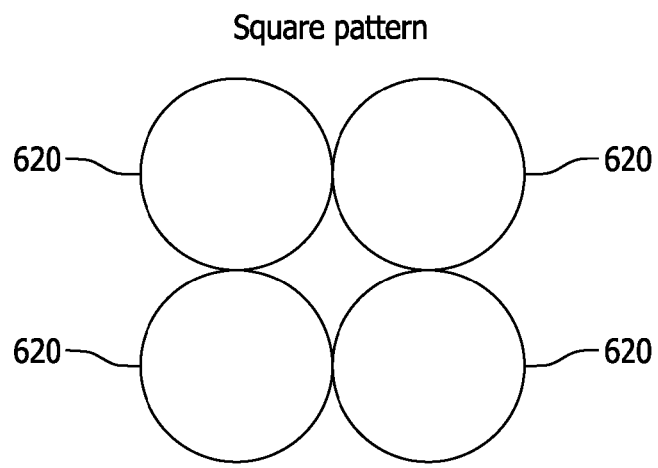
FIG. 6B illustrates alternate recess opening arrangements in a photocathode top surface.

FIG. 6B illustrates alternate recess opening arrangements in a photocathode top surface. FIG. 6B is a top plan view of the top surface of a photocathode. As shown in FIG. 6A, four openings 620 are arranged in a square pattern. In other embodiments, other opening arrangements may be utilized. By increasing the number openings on the surface of the second side of the photocathode, electron yield is increased.

Simulation Results

A computer simulation, in CST Studio Suite software was used to build a model to evaluate X-ray detector performance requirements, namely, spatial resolution of 40μ or better and a temporal resolution of 1-10 ps. The resulting electric field, electron trajectories, energies, velocities, and angular distributions were simulated using this software. The model was also used to predict the performance of two photocathode materials, CsI and Au by choosing the appropriate secondary electron energy and angular distributions. The simulations were performed for a cathode to mesh gap of 1 mm with electric field ranging from 3125-10 000 V/mm. All results use a 3125 V/mm field, which is used in the Dilation X-ray Imager (DIXI).

Figure 7A:
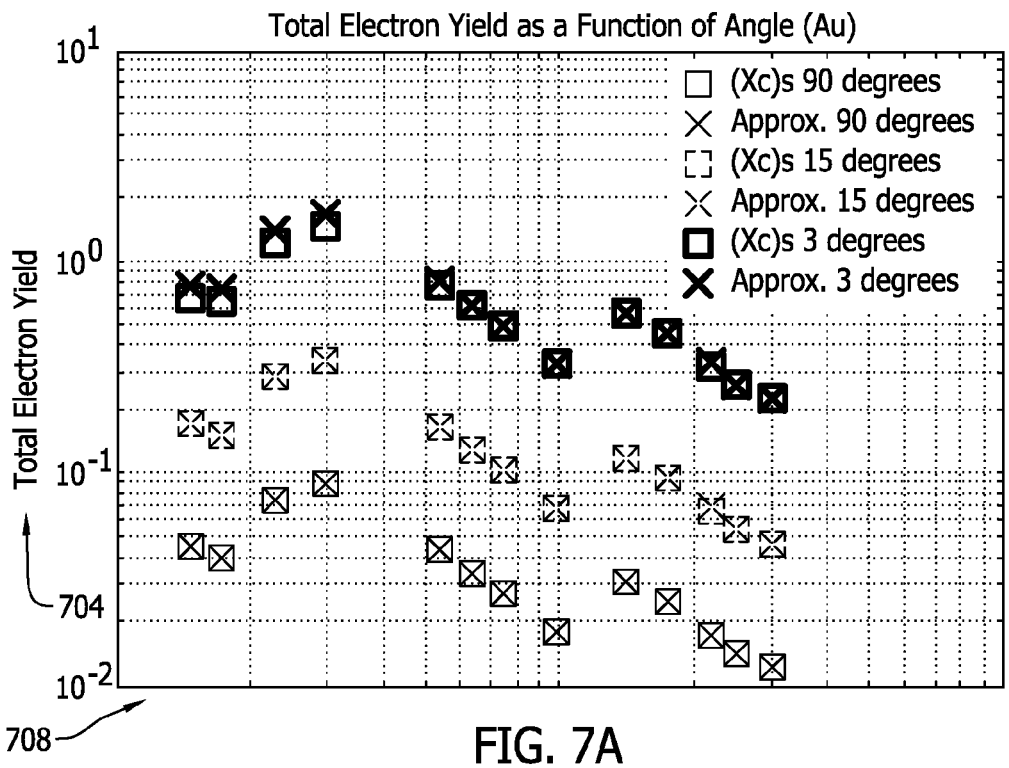
FIGS. 7A and 7B illustrate resulting electric field simulation of the recessed cone geometry.
Figure 7B:
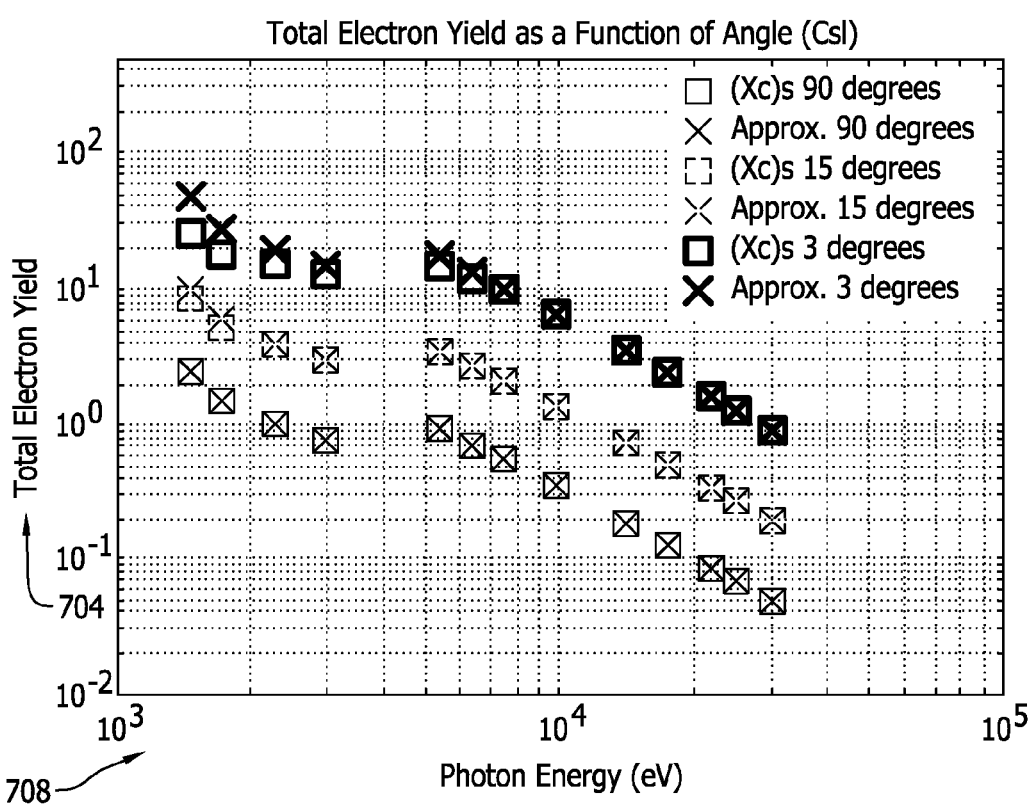
Figure 7C:
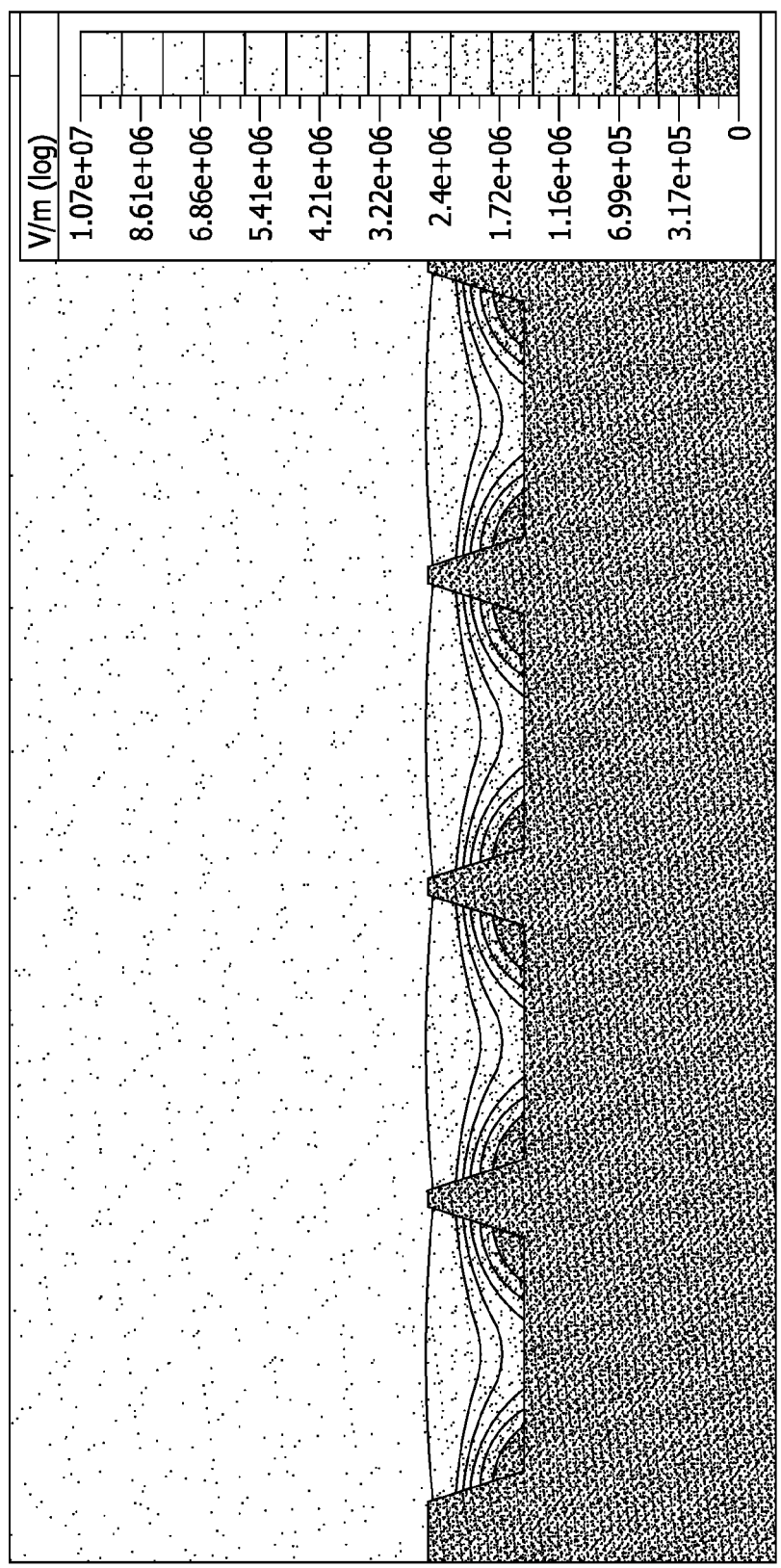
FIG. 7C illustrates exemplary electric field within the structure.

A resulting electron yield of the recessed cone geometry is shown in FIGS. 7A and 7B. FIG. 7C shows exemplary electron fields. FIG. 7A illustrates a plot of electron yield versus photon energy for Au at three different angles based on calculated and actual results. The vertical axis 704 defines total electron yield while the horizontal axis 708 defines photon energy. As shown, the plots for 90 degrees, 15 degrees, and 3 degrees are shown with the electron yield being the highest for 3 degrees.

FIG. 7B illustrates a plot of electron yield versus photon energy for CsI at three different angles of incidence for x-ray energy for the 1-30 keV energy range for 200 Angstrom Au and 1000 Angstrom CsI photocathode materials. These plots are based on calculated and actual results. The calculated values and approximations are shown with squares and crosses respectively. The vertical axis 704 defines total electron yield while the horizontal axis 708 defines photon energy. As shown, the plots for 90 degrees, 15 degrees, and 3 degrees are shown with the electron yield being the highest for 3 degrees.

As can be seen in FIGS. 7A and 7B, the structured surface with indented structures the back surface of the photocathode exhibits an increased total electron yield in both materials: Au and CsI. It is contemplated that other materials will exhibit similar benefits and increases in electron yield due to the structured surface disclosed herein. While 3 degrees for the inwardly sloping sided of the structures yields the highest electron yield, the spatial resolution may be lower than the 15 degree embodiments.

FIG. 7C illustrates exemplary electric field within the structure. As shown the electric fields changes within the structure as shown.

The detector used for the qualification of the structured photocathode design presented herein is derived from instruments which utilize micro-channel plates as imagers or have complex imaging systems. Hence, any contribution to the spatial and temporal resolution from the secondary electron distribution in the acceleration gap region (cathode to mesh anode) of these cameras is assumed to be minimal and ignored. Geometrically enhanced photocathodes do introduce a sizeable spatial and temporal spread to the electron distribution, depending on the structure depth and diameter. CST (computer simulation program) was used to fully simulate the temporal, spatial, and angular spread of electrons that are generated at the structured photocathode surface. The results (at the exit plane of the acceleration gap region) were compared to the nominal detector requirements.

Figure 8:
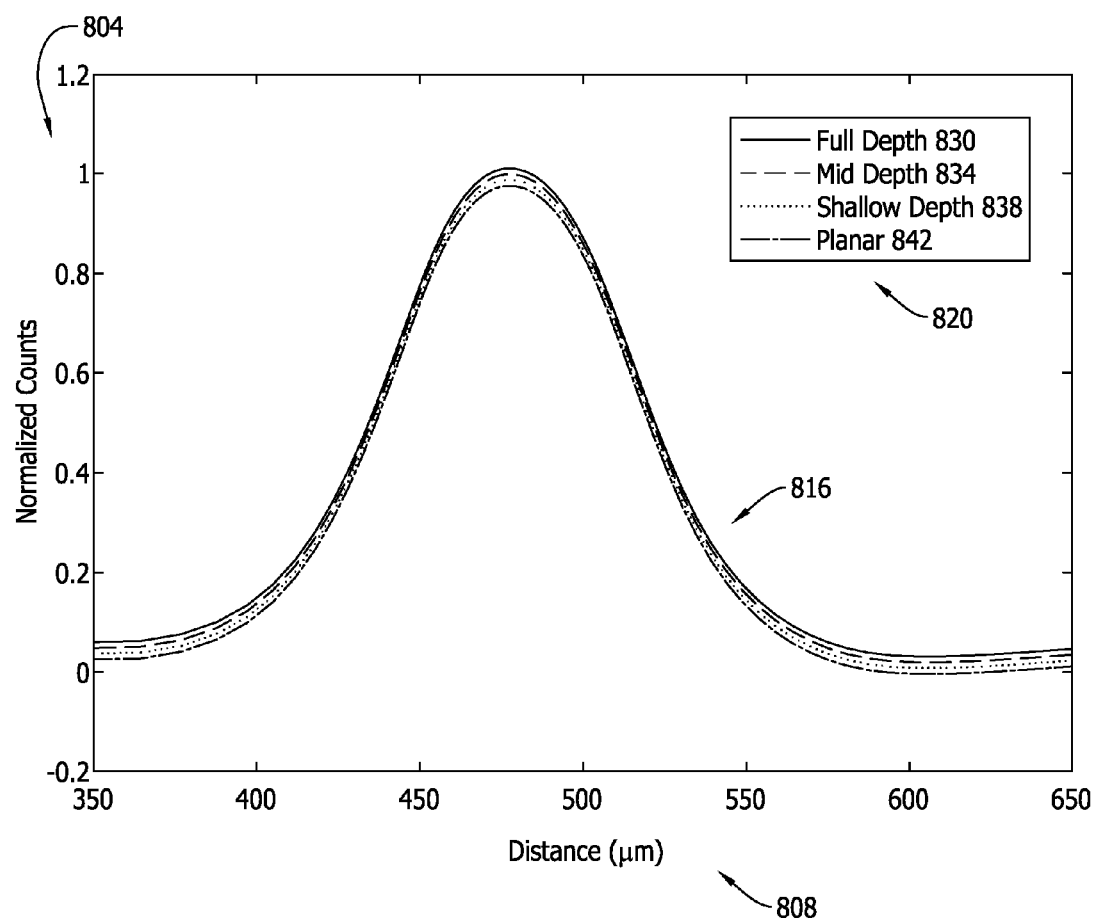
FIG. 8 illustrates measured spatial resolution for various depths of the structured photocathode depths.

The spatial resolution of the recessed cone photocathode is limited by the trajectory of electrons generated at the cone walls. These electrons follow parabolic paths with a final resolution element radius that depends on the photocathode material, along with the diameter and angle of the structure. A small degradation in spatial resolution was seen when comparing the performance of CsI to that of Au, due to a difference in the initial kinetic energy of the electrons generated at the photocathode surface. During testing, the smallest radius and depth were set by the strength of the voltage gradient within the cavity, corresponding to a diameter of 4 μm and depth of 2 μm and produced a spatial resolution element of ~40 μm at the output of the acceleration gap region as shown in FIG. 8. In addition, using a recessed cathode structure introduces a flat surface to the accelerating region. This allows and establishes minimal back ground signal and no breakdown (i.e. arcing) between cathode and mesh. It is this flat surface that allows the cathode to operate in very high E fields that are present in streak cameras and dilation tubes.

FIG. 8 illustrates plots of measured spatial resolution for various depths of the structured photocathode depths. The vertical axis 804 represents normalized electron counts while the horizontal axis 808 represents distance. The plots 816 are shown for different structure depths as referenced in the key 820. Plots are provided for electron yield for a full depth recess 830, a mid-depth recess 834, a shallow depth 838 and a planar (flat with no surface structure) surface 842. As can be seen from the plots 816, the variance in spatial resolution is minimal and thus establishing a structured surface does not degrade spatial resolution.

TABLE 1

Predicted fractional increase in the total electron yield for a set of recessed cone and pyramid geometries at 14 keV.

| Recessed Geometry | Incidence Angle | Diameter μm | Depth μm | Au TEY Fractional Increase | C$_s$I TEY Fractional Increase |
|---|---|---|---|---|---|
| Cone | 15 | 6 | 3 | 1.76 | 1.77 |
| Pyramid | 15 | 6 | 3 | 1.85 | 1.85 |
| Cone | 10 | 6 | 3 | 1.88 | 1.87 |
| Pyramid | 10 | 6 | 3 | 2.12 | 2.11 |

Smaller spatial resolutions are possible by choosing an appropriate diameter and angle of the cavity. An electron emitted from the cavity wall is ejected at a normal angle to the cathode surface. The emitted electrons leave the cathode following a curved path toward the accelerating mess that is set by the cavity wall angle and diameter.

The temporal resolution of the recessed cone photocathode showed a dependence on the cavity depth and the angle of the cavity walls. The largest contributor to the temporal spread comes from electrons generated at the cavity bottom.

A temporal difference of 980 fs was calculated for a structure with a depth of 3 μm, and a wall angle of 15°. Increasing the cavity depth reduced the voltage gradient within the cavity and had the effect of increasing the temporal spread in the emitted electron distribution. The current photocathode design is within the temporal resolution of many X-ray detectors, with a best temporal resolution of ~1 ps.

The recessed cone geometry showed a small increase in the angular divergence of the electron distribution at the exit plane of the acceleration region when compared to a planar photocathode. A 5 mrad angular spread was seen for a planar photocathode, in comparison to a 25 mrad for an electron emitted from the structured photocathode. This small effect will not degrade the spatial resolution of most detectors and should be simulated for a full detector performance study.

The total electron yield emitted from a structured photocathode is the sum of the projected yield-enhanced contribution from the angled sides, and the yield generated at the planar surface regions. The predicted fractional yield increase, defined as the enhanced yield divided by yield at normal incidence, is listed in Table 1 for a set of recessed cone and pyramid structure parameters. The total yield increase for the disclosed structure surface design is on the order of 2 times, which is largely driven by the spatial and temporal resolution requirements of current X-ray imaging detectors. It is conceivable that an increase as large as four times can be produced with a structure that utilizes the full depth of the cone (~17 μm). This depth will degrade the temporal performance of the photocathode, with temporal spread predicted to be as high as 100 ps. It is proposed that the final prototype design will be set by etching of the substrate material and will utilize a thicker CsI photocathode for energies above 10 keV.

FIG. 9A illustrates top plan view of a photodetector arranged according the present invention for use in testing. The photodetector 904 is divided into two portions. A structure portion 908 is configured in accordance with the structured design disclosed herein. A planar portion 912 is configured in accordance with the prior art design, namely flat or non-structured. This photocathode was utilized in connection with an x-ray source and streak camera to compare, side by side, the prior art photocathode and new structured photocathode.

FIG. 9B illustrates a side view of the photodetector of FIG. 8A. As shown, the structured portion 908 is recesses which form recessed structures while the planar portion 912 is generally flat.

FIG. 9C illustrates a signal plot resulting from the photocathode output shown in FIG. 9A. As part of the side-by-side comparison, two measurements were conducted to identify potential detector performance changes caused by the presence of a structured photocathode surface. To characterize improvement in signal level, X-ray images were recorded for each prototype. The recorded signal plot of FIG. 10 results from the structure photocathode side-by-side with the prior art planar photocathode surface as shown in FIGS. 9A and 9B. The vertical axis 1004 represents electron yield and the horizontal axis 1008 represents distance or location on the photodetector. The plot represents electron yield 1012. As can be seen, the left most side 1016 of the plot 1012 has a greater electron yield than the right most side 1020 of the plot. The plot 1012 is aligned with the photocathode of FIG. 9A thus illustrating the corresponding relationship between the structured surface 908 of the photo cathode and the increased yield of the signal in the left hand side 1016 of the plot.

During testing, background levels were near ~510 counts, with lowest signal of 500 counts above background recorded in the planar cathode region. An increase in signal magnitude between 2.7× and 4.5× was expected for the structure, details of the model and calculations. In terms of total quantum efficiency, a planar Au photocathode at 7.5 keV emits an average of 0.015 electrons per photon. During testing and measurement, the structured surfaces increase this number to 0.05 electrons per photon. The predicted and measured yield from all three structures is summarized in Table 2.

TABLE 2

Summary of measurement results for three structured photocathodes.

| Cathode Type | Structure Dimensions (μm) | Measured Fractional Increase | Predicted Fractional Increase | LSF FWHM (μm) |
|---|---|---|---|---|
| Shallow Depth | 6 × 6 × 4 | 2.3 ± 0.02 | 2.2-2.4 | 68 ± 4.2 |
| Mid Depth | 6 × 6 × 8 | 3.2 ± 0.04 | 2.9-3.5 | 82 ± 4.8 |
| Full Depth | 6 × 6 × 16 | 3.5 ± 0.01 | 2.7-4.5 | 72 ± 2.5 |

The measured fractional increase is defined as the ratio between the signal recorded from the structured region 908 and flat surface region 912. The minor increase in yield from the mid depth to the full depth may be due to differences in the etched wall angles and widths of the two prototypes, namely an etch that is not fully tapered to a full cone and a decrease in the electric field strength within the full depth cavity that may be trapping emitted electrons. Limitations in manufacturing affect results. In general, the measured data falls within the predicted yield increase, verifying the prediction model and calculations.

In summary, a computer simulation in CST studio suite verified improvements from a geometrically enhanced photocathode structure design that withstands a high voltage gradient, has a spatial resolution of ~40 μm and temporal dispersion that is 1-10 ps. The structure utilized a near grazing incidence effect to increase the total electron yield from Au and CsI photocathodes in the 1-30 keV range. The performance of a variety of pillar and recessed structures was simulated to verify operation and expected improvements. Recessed cone and pyramid geometries were identified as a design that did not degrade the performance of current X-ray imaging detectors, but other recessed shapes are also contemplated.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A photocathode for use in x-ray detection from 1 to 30 keV comprising:
   a substrate having a first side and a second side, the first side configured to receive x-ray energy and the second side opposing the first side;
   a structured surface associated with the second side of the substrate, the structured surface comprising a plurality of recesses from the second side of the substrate into the substrate such that one or more of the plurality of recesses has a recess side wall that forms a wall angle of between 5 and 15 degrees.

2. The photocathode of claim 1 wherein the second side is coated with gold or cesium iodide.

3. The photocathode of claim 1 wherein the recess is a cone shape.

4. The photocathode of claim 1 wherein the recess is a pyramid shape.

5. The photocathode of claim 1 wherein the recess side wall forms a wall angle of 5 degrees.

6. The photocathode of claim 1 wherein the recess side wall forms a wall angle of 10 degrees.

7. A method for generating electrons based on x-ray strikes comprising:
   providing a photocathode in an x-ray path, the photocathode comprising a substrate having a first surface and a second surface such that the distance between the first surface and second surface is less than 200 um, the first surface facing the x-ray path and the second surface generally parallel to and opposite the first surface, the second surface configured with a structured surface including recesses in the second surface, the recesses extending from the second surface toward the first surface;
   emitting x-ray energy in the range of 1 keV to 12 keV to the photocathode; and
   detecting x-rays striking the photocathode based on electron yield from the photocathode.

8. The method of claim 7 wherein the recesses are formed from one or more side walls.

9. The method of claim 7 wherein the recesses are conical shaped without a pointed or flat top.

10. The method of claim 7 wherein the recesses are pyramid shaped with a pointed or flat top.

11. The method of claim 7 wherein the recess includes a recess side wall that forms a wall angle of 10 degrees.

12. The method of claim 7 wherein the recess includes a recess side wall that forms a wall angle of 5 degrees.

13. The method of claim 7 wherein an efficiency of the electron yield resulting from the method is greater than $0.04^8$ electrons per photons at 1.5 keV.

14. A photocathode for use in x-ray detection comprising:
   a substrate comprising:
   a first surface configured to receive x-ray energy;
   a substrate portion having a thickness of less than 120 microns, the substrate located between the first surface and a second surface; and
   the second surface opposing the first side, the second surface having a generally planar top surface with a plurality of recesses from the planar top surface extending into the substrate such that at least one of the plurality of recesses has a recess side wall that forms a wall angle of between 5 and 15 degrees.

15. The photocathode of claim 14 wherein the second side is coated with gold or cesium iodide.

16. The photocathode of claim 14 wherein the recess is a cone shape having an open cone base on the top surface that narrows at it extends into the substrate toward a pointed or flat end opposing the open cone base.

17. The photocathode of claim 14 wherein the recess is a pyramid shape having an open pyramid base on the top surface that narrows as it extends into the substrate toward a pointed or flat end opposing the open pyramid base.

18. The photocathode of claim 14 wherein the recess side wall forms a wall angle of 10 degrees.

19. The photocathode of claim 14 wherein the recess side wall forms a wall angle of 5 degrees.

* * * * *